United States Patent
Roques et al.

(10) Patent No.: US 7,930,937 B2
(45) Date of Patent: Apr. 26, 2011

(54) DETECTION DEVICE MAKING IT POSSIBLE TO MEASURE THE QUANTITY OF HOT WATER REMAINING IN A STORAGE RESERVOIR

(75) Inventors: Bernard Roques, Bilieu (FR); Jean-Marc Riondy, Belley (FR)

(73) Assignee: Cotherm, Vinay (FR)

(*) Notice: Subject to any disclaimer, the term of this patent is extended or adjusted under 35 U.S.C. 154(b) by 414 days.

(21) Appl. No.: 12/168,928

(22) Filed: Jul. 8, 2008

(65) Prior Publication Data
US 2009/0019931 A1    Jan. 22, 2009

(30) Foreign Application Priority Data
Jul. 20, 2007    (FR) ...................... 07 05252

(51) Int. Cl.
*G01F 23/22* (2006.01)
(52) U.S. Cl. ....................................................... 73/295
(58) Field of Classification Search .............. 73/295, 73/299, 301
See application file for complete search history.

(56) References Cited

U.S. PATENT DOCUMENTS

| 5,596,952 | A | * | 1/1997 | Lannes et al. | 122/14.1 |
| 5,660,165 | A | * | 8/1997 | Lannes | 126/641 |
| 6,644,125 | B1 | * | 11/2003 | Siess et al. | 73/754 |
| 7,240,557 | B2 | * | 7/2007 | Muller et al. | 73/706 |
| 2004/0093952 | A1 | * | 5/2004 | Eisenbarth | 73/732 |
| 2008/0216821 | A1 | * | 9/2008 | Sweet | 126/585 |

FOREIGN PATENT DOCUMENTS

| EP | 1 281 940 A | 2/2003 |
| GB | 1 027 253 A | 4/1966 |

* cited by examiner

*Primary Examiner* — Hezron Williams
*Assistant Examiner* — Paul West
(74) *Attorney, Agent, or Firm* — Young & Thompson

(57) ABSTRACT

The detection device for measuring the quantity of hot water remaining inside a storage reservoir and more particularly inside a tank (2) of a water heater (3, 30), comprises a capillary tube (10) containing a heat-carrying fluid which is placed either inside, or outside the tank (2) of the water heater (3, 30) and an indicator device (12) coupled to said capillary tube (10), said indicator device (12) comprising an amplifying device (15) disposed outside said tank (2) and making it possible to transmit under the effect of the expansion of the fluid contained in the capillary tube (10) either a motion to a member (16), or a variation in resistance to an electronic measurement card (24) in such a way as to continuously indicate the quantity of hot water available remaining in the tank (2) of the water heater (3, 30).

12 Claims, 5 Drawing Sheets

DETECTION DEVICE MAKING IT POSSIBLE TO MEASURE THE QUANTITY OF HOT WATER REMAINING IN A STORAGE RESERVOIR

The present invention pertains to a detection device making it possible to measure the quantity of hot water remaining in a storage reservoir and more particularly in a sanitary hot water reservoir.

Patents FR 2 828 279 and EP 1 281 940 disclose a detection device of this kind comprising a capillary tube provided with amplifying means consisting of serpentines or of bulbar swellings containing a fluid that can expand as a function of the quantity of hot water contained in the water heater, and means for transforming the volume variation into a visual signal indicating the quantity of hot water present in the water heater.

The means for transforming the volume variation into a visual signal consist of a vessel shut off by a membrane which moves under the effect of the volume variations so as to pivot a link rod that drives in linear displacement a rack meshing with a pinion secured to a needle positioned in front of a graduated scale.

It is noted that the detection devices that exist today allow only an estimation of the quantity of hot water remaining in a water heater. These devices are based chiefly on the principle of sensors placed at regular intervals inside the tank of the water heater.

The term sensors is understood to mean either thermistors for electronic devices, or bulbs or serpentines filled with a heat-carrying fluid and linked together by a capillary tube as far as electromechanical devices are concerned.

However, these detection devices provide only discrete information about the quantity of hot water remaining i.e. ¼, ½, ¾ of a full tank when said device comprises four sensors placed inside the tank of the water heater.

The detection device according to the present invention is aimed at providing continuous information regarding the quantity of hot water remaining in the tank of the water heater. Moreover, the detection device according to the present invention operates equally well whether placed inside or outside the tank of the water heater, laid flat against the metal wall.

The detection device for measuring the quantity of hot water remaining inside a storage reservoir and more particularly inside a tank of a water heater comprises a capillary tube containing a heat-carrying fluid which is placed either inside, or outside the tank of the water heater and an indicator device coupled to said capillary tube, said indicator device comprising an amplifying device disposed outside said tank and making it possible to transmit under the effect of the expansion of the fluid contained in the capillary tube either a motion to a member, or a variation in resistance to an electronic measurement card, in such a way as to continuously indicate the quantity of hot water available remaining in the tank of the water heater.

The detection device according to the present invention comprises a capillary tube which is designed to be substantially the height of the tank of the water heater.

The detection device according to the present invention comprises a capillary tube which is placed inside the tank of the water heater and passes, by way of a gland, through the thickness of the bottom of said tank so as to allow it to be coupled to the indicator device.

The detection device according to the present invention comprises a capillary tube which is placed outside the tank of the water heater, underlying the layer of the thermal insulant and cemented against and over the entire height of the vertical external face of said tank so as to allow it to be coupled to the indicator device.

The detection device according to the present invention comprises an indicator device provided with an amplifying device making it possible to transmit a motion to a member moving along a graduated scale indicating the quantity of hot water available remaining in the tank.

The detection device according to the present invention comprises an amplifying device consisting of a Bourdon tube making it possible to transmit the motion to the member formed of a needle secured to an axle in such a way as to move along the graduated scale.

The detection device according to the present invention comprises an axle connected with the free end of the Bourdon tube by way of a notch making it possible, during the deformation of said tube under the effect of the expansion of the fluid contained in the capillary tube, to rotate the needle.

The detection device according to the present invention comprises an indicator device provided with an amplifying device which consists of a membrane coupled hermetically to the capillary tube and of an electronic sensor linked by a connection to an electronic system.

The detection device according to the present invention comprises an electronic sensor overlaid on the surface of the membrane whose deformation is proportional to the expansion of the heat-carrying fluid contained inside the capillary tube in such a way as to transcribe into a variation in resistance that can be utilized by an electronic measurement card.

The detection device according to the present invention comprises an electronic measurement card provided inside a housing allowing display in digital form or in visual form such as a luminous bar graph of the quantity of hot water available remaining in the tank.

The detection device according to the present invention comprises an amplifying device linked by a connection to an electronic system allowing the control of at least one boost resistor of an electro- or hydro-solar water heater.

The detection device according to the present invention comprises an amplifying device linked by a connection to an electronic system allowing the control of the circulation of a heat-carrying fluid issuing from a boiler into a serpentine located inside a hydro-solar water heater.

The detection device according to the present invention comprises an amplifying device linked by a connection to an electronic system allowing the control of the circulation of a heat-carrying fluid issuing from solar sensors into a serpentine located inside an electro- or hydro-solar water heater.

The appended drawings, given by way of example, will allow a better understanding of the invention, the features that it exhibits and the advantages that it may afford:

Figure 1:
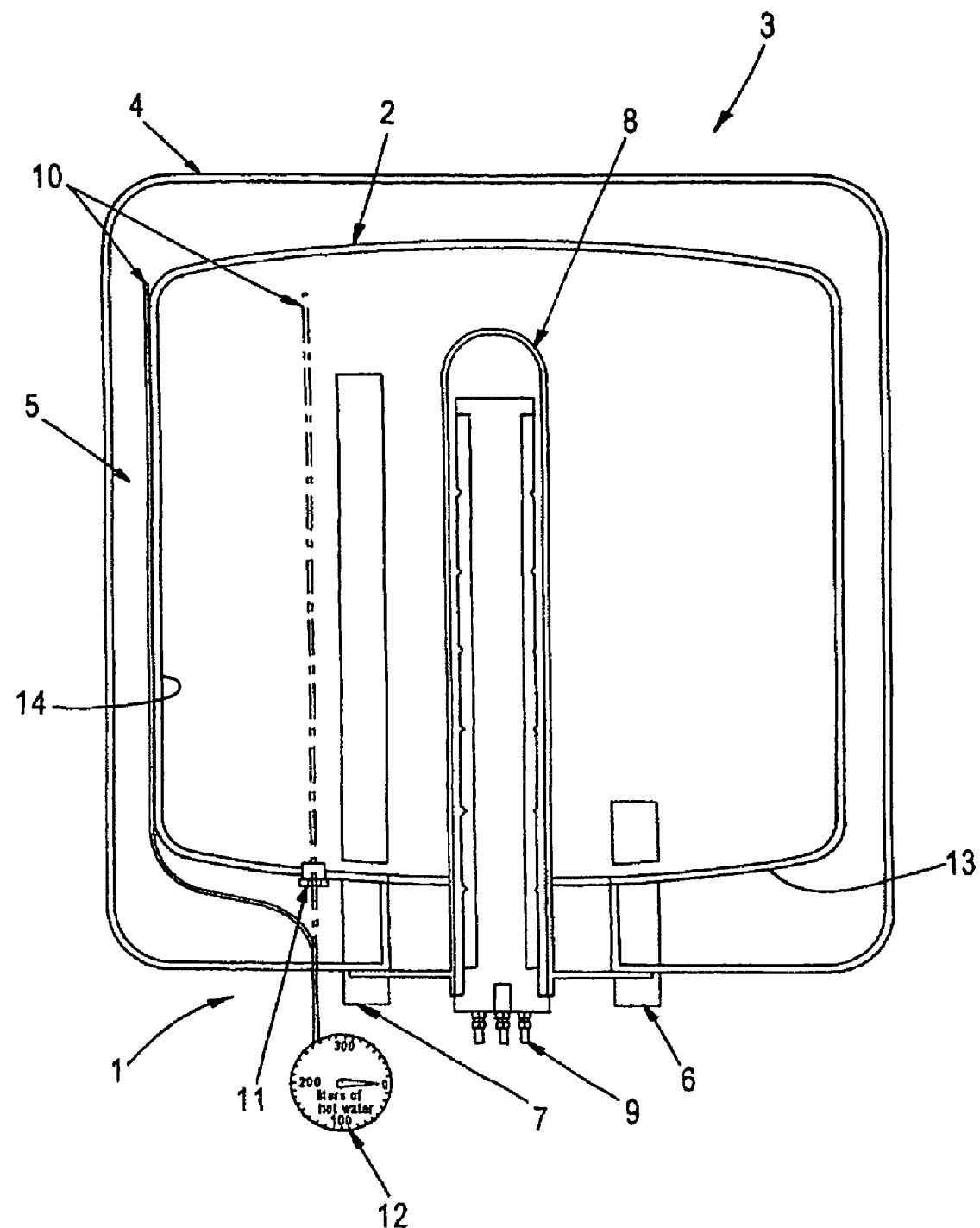
FIGS. 1 and 2 are views illustrating an electromechanical detection device for measuring the quantity of hot water remaining in a storage reservoir according to the present invention.
Figure 2:
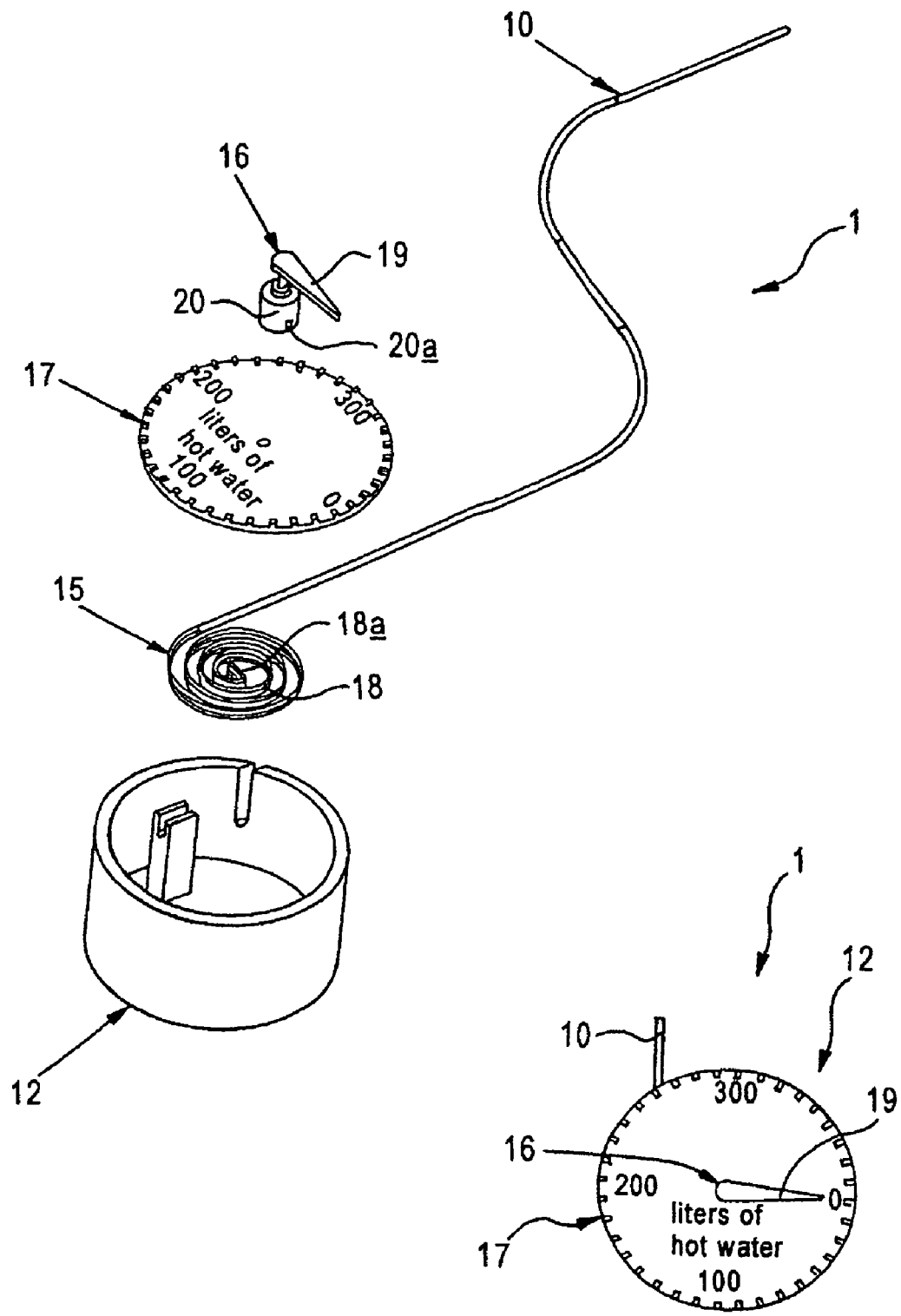

Shown in FIGS. 1 and 2 is an electromechanical detection device 1 for measuring the quantity of hot water remaining inside a storage reservoir and more particularly inside a tank 2 of a water heater 3. The water heater 3 consists of an outer jacket 4 inside which is disposed the tank 2. The water heater 3 comprises a thermal insulant 5 between the outer jacket 4 and the tank 2.

The water heater 3 comprises a cold water inlet 6 and a hot water outlet 7 allowing the filling and extraction of the water contained inside the tank 2.

Inside the tank 2, the water heater 3 comprises a glove finger 8, receiving in its internal part an electrical heating resistor 9.

The water heater 3 comprises an electromechanical detection device 1 which consists of a capillary tube 10 containing a heat-carrying fluid and of an indicator device 12 coupled to said capillary tube.

The capillary tube 10 is provided with a length identical to the height of the tank 2, whether it is placed inside or outside said tank.

When the capillary tube 10 is placed inside the tank 2, leaktightness is ensured for example by a gland 11 passing through the thickness of the bottom 13 of said tank so as to allow it to be coupled to the indicator device 12.

When the capillary tube 10 is placed outside the tank 2, the former underlies the layer of the thermal insulant 5 and is cemented against and over the entire height of the vertical external face 14 of said tank.

It is noted that, under the action of the heat contained in the water, the heat-carrying fluid held inside the capillary tube expands.

This expansion of the heat-carrying fluid is transmitted to the indicator device 12 and more particularly to an amplifying device 15 disposed outside the tank 2 and making it possible to transmit a motion to a member 16 moving along a graduated scale 17 indicating the quantity of hot water available remaining in said tank 2 of the water heater 3.

In a first exemplary embodiment, the amplifying device 15 consists of a Bourdon tube 18 making it possible to transmit the motion to the member 16 formed of a needle 19 secured to an axle 20 in such a way as to move along the graduated scale 17.

The axle 20 is connected with the free end 18a of the Bourdon tube 18 by way of a notch 20a making it possible, during the deformation of said tube under the effect of the expansion of the fluid contained in the capillary tube, to rotate the needle 19.

At any moment, the water being stratified through temperature in the tank 2, the expansion of the heat-carrying fluid and therefore the motion along the graduated scale 17 are proportional to the quantity of heat contained in the water. The measurement provided is therefore continuous and independent of the positioning of the capillary tube 10 with respect to the tank 2.

Figure 3:
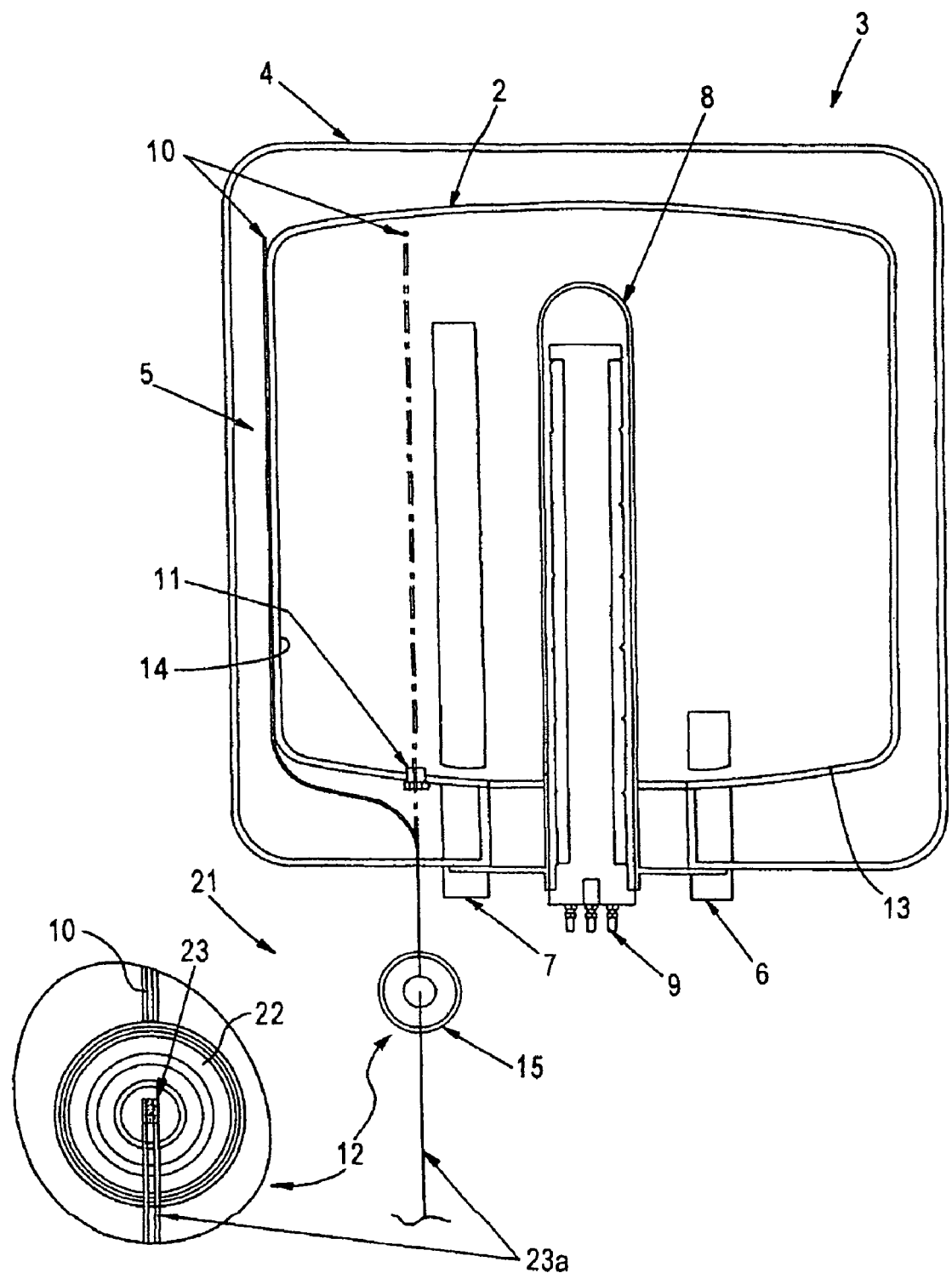
FIGS. 3 and 4 are views representing an electronic detection device for measuring the quantity of hot water remaining in a storage reservoir according to the present invention.
Figure 4:
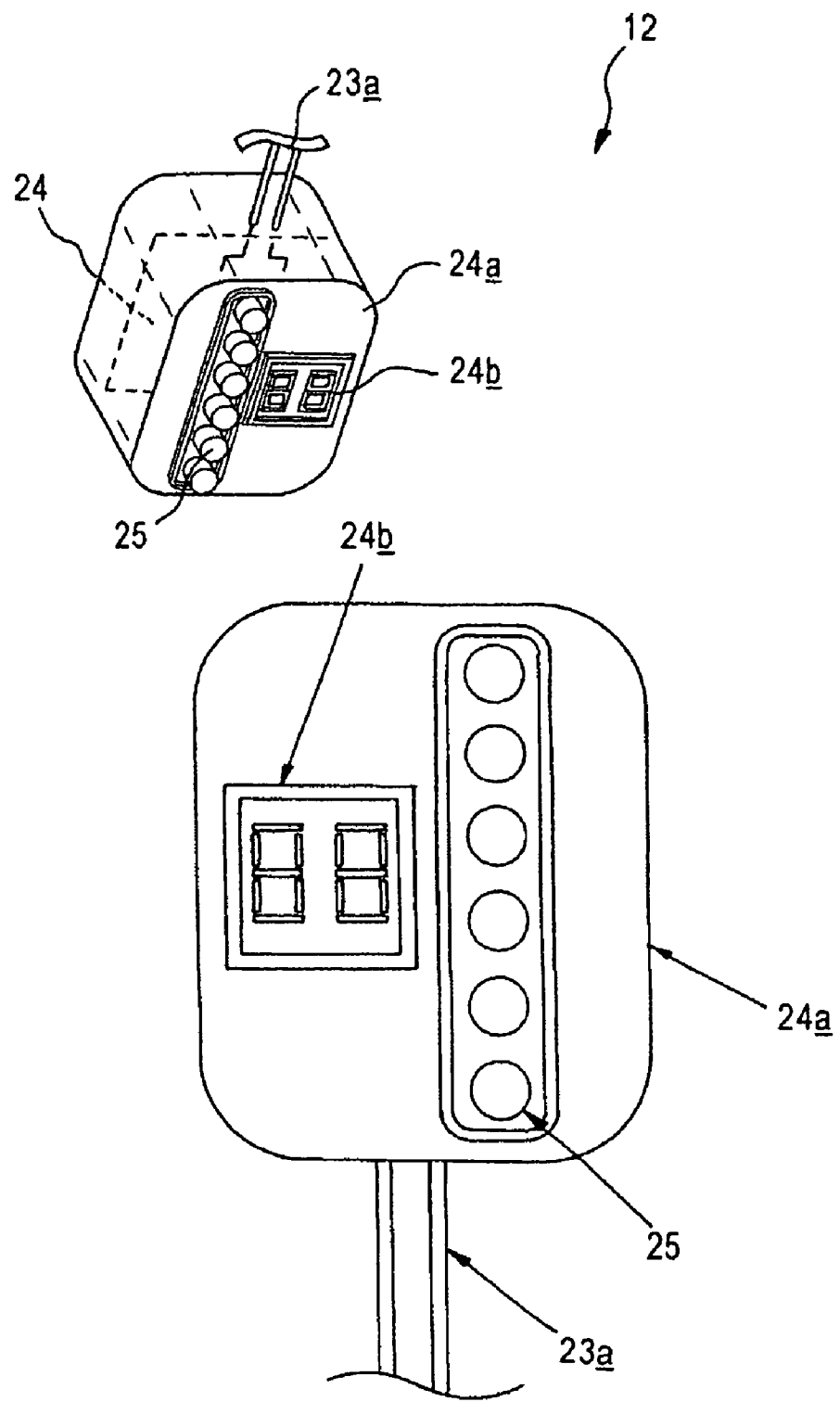

Represented in FIGS. 3 and 4 is an electronic detection device 21 for measuring the quantity of hot water remaining inside a storage reservoir and more particularly inside the tank 2 of the water heater 3 as described previously.

The electronic detection device 21 comprises a capillary tube 10 which is coupled to an indicator device 12 comprising an amplifying device 15 disposed outside the tank 2 and consisting of a membrane 22 secured to an electronic sensor 23 linked by a connection 23a to an electronic measurement card 24.

The capillary tube 10 is provided with a length identical to the height of the tank 2, whether it is placed inside or outside said tank.

When the capillary tube 10 is placed inside the tank 2, leaktightness is ensured for example by a gland 11 passing through the thickness of the bottom 13 of said tank so as to allow it to be coupled to the indicator device 12.

When the capillary tube 10 is placed outside the tank 2, the former underlies the layer of the thermal insulant 5 and is cemented against and over the entire height of the vertical external face 14 of said tank.

It is noted that under the action of the heat contained in the water, the heat-carrying fluid held inside the capillary tube 10 expands.

Thus, the capillary tube 10 is hermetically coupled to the membrane 22 which deforms under the effect of the expansion of the heat-carrying fluid allowing the membrane to be flattened against the electronic sensor 23.

The deformation of the membrane 22 is proportional to the expansion of the heat-carrying fluid contained inside the capillary tube 10. This deformation of the membrane 22 is transcribed by means of the electronic sensor 23 into a variation in resistance that can be utilized by the electronic measurement card 24 provided for example inside a housing 24a.

Thus, the quantity of hot water remaining inside the tank 2 can therefore be displayed by way of the electronic measurement card 24 in digital form 24b or in visual form, such as a luminous bar graph 25.

Also, the data provided by the electronic detection device 21 may be utilized directly by a more complex regulating system 26.

In this regard, the electronic detection device 21 may be used to perform so-called "intelligent" boosts of heat to undertake savings of electrical consumption by optimizing the moment of heat boost.

For this purpose, in the case of a conventional electric water heater 3, the moment of boost can be shifted so that hot water does not have to be needlessly stored for too long a time, thus limiting the thermal losses across the insulation.

Figure 5:
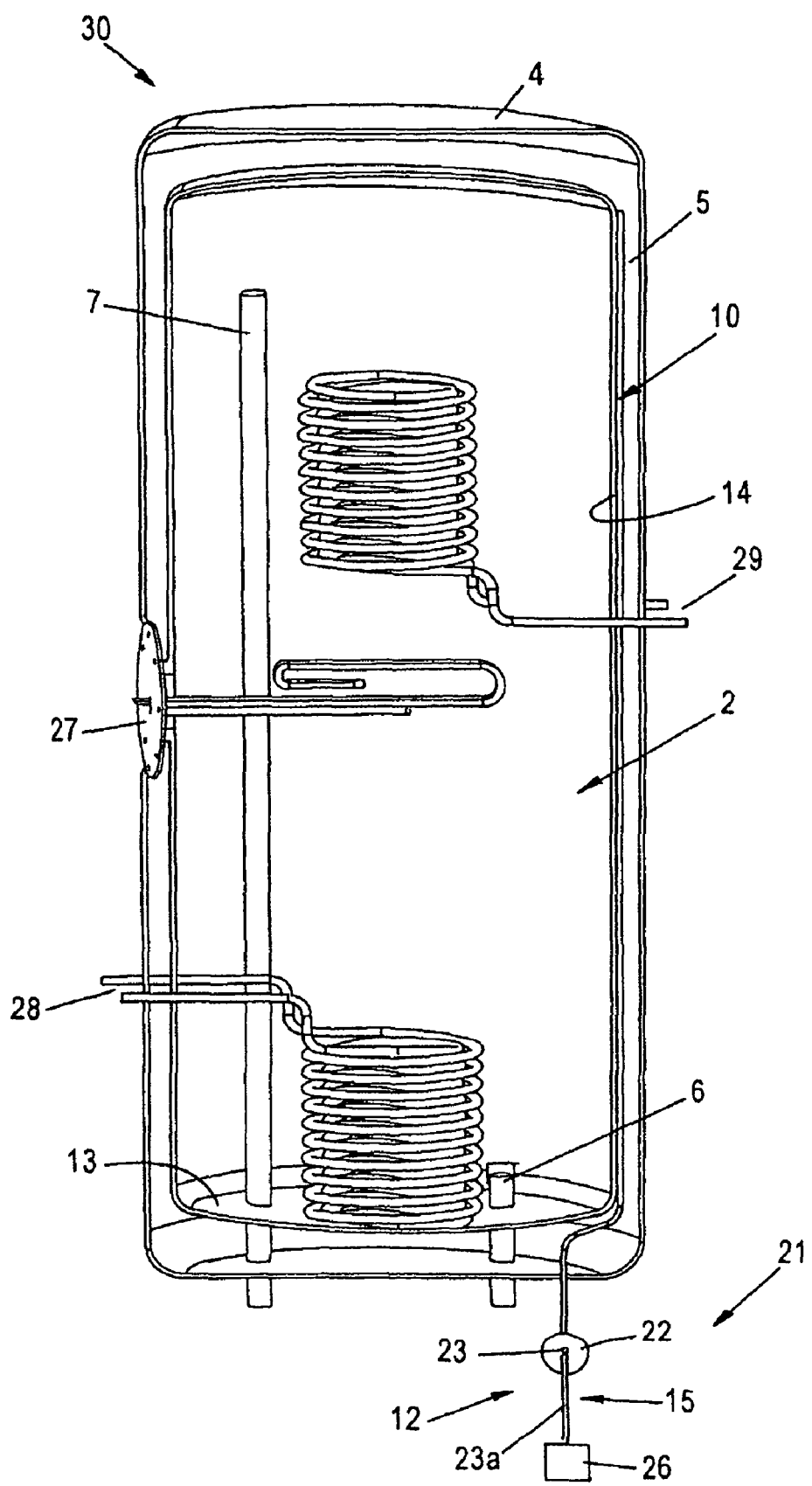
FIG. 5 is a view showing an electronic detection device for measuring the quantity of hot water remaining in a storage reservoir of an electro-solar or hydro-solar water heater according to the present invention.

FIG. 5 shows an electronic detection device 21 for measuring the quantity of hot water remaining inside a storage reservoir and more particularly inside the tank 2 of an electro- or hydro-solar water heater 30.

The water heater 30 consists of an outer jacket 4 inside which is disposed the tank 2. The water heater 3 comprises a thermal insulant 5 between the outer jacket 4 and the tank 2.

The water heater 30 comprises a cold water inlet 6 and a hot water outlet 7 allowing the filling and extraction of the water contained inside the tank 2.

The water heater 30 comprises a serpentine 28 allowing the circulation of a fluid heated by solar sensors.

In this type of electro- or hydro-solar water heater 30 the heat boost is ensured by an electrical resistor 27, or by the circulation in a serpentine 29 of a fluid heated by a boiler.

In this type of water heater, the moment of boost can be shifted, for example, to the end of the day.

Before instigating this heat boost, it is necessary to previously verify the quantity of hot water available in the tank 2 with the user's consumption profile, thus fully profiting from the solar input.

Knowing that the electronic detection device 21 according to the present invention provides exact and continuous information regarding the quantity of hot water available in the tank 2, it is therefore possible to couple this device with a boost system 26 making it possible to accurately determine, in real time, the optimum moment of the heat boost.

To do this, the electronic detection device 21 comprises a capillary tube 10 which is placed either inside, or outside the tank 2, whereas the electronic sensor 23 flat against the membrane 22 is coupled by a connection 23a to the electronic system 26.

Depending on the water heater, the electronic system 26 allows the control of the circulation of a heat-carrying fluid issuing from a boiler into a serpentine 29 located inside the tank 2 of a hydro-solar water heater 30 or the control of the circulation of a heat-carrying fluid issuing from solar sensors into a serpentine 28 located inside the tank 2 of an electro- or hydro-solar water heater 30.

This electronic system 26 can also ensure other functions such as the circulation of the fluid in the serpentine linked to the solar sensor, the programming or learning of the user's consumption profile, the metering of electrical and solar energy.

It should moreover be understood that the foregoing description has been given merely by way of example and that it in no way limits the field of the invention from which there would be no departure on replacing the execution details described with any other equivalents.

The invention claimed is:

1. A detection device for measuring the quantity of hot water remaining inside a storage reservoir and more particularly inside a tank (2) of a water heater (3, 30), which device comprises:
   a capillary tube (10) containing a heat-carrying fluid which is placed either inside, or outside the tank (2) of the water heater (3, 30); and
   an indicator device (12) coupled to said capillary tube (10), said indicator device (12) comprising an amplifying device (15) disposed outside said tank (2) and making it possible to transmit under the effect of the expansion of the fluid contained in the capillary tube (10) either a motion to a member (16), or a variation in resistance to an electronic system (24, 26) in such a way as to continuously indicate the quantity of hot water available remaining in the tank (2) of the water heater (3, 30),
   wherein the capillary tube (10) is placed outside the tank (2) of the water heater (3, 30), underlying a layer of a thermal insulant (5) and cemented against and over the entire height of the vertical external face (14) of said tank so as to allow it to be coupled to the indicator device (12).

2. The detection device as claimed in claim 1, wherein the capillary tube (10) is designed to be substantially the height of the tank (2) of the water heater (3, 30).

3. The detection device as claimed in claim 1, wherein the capillary tube (10) is placed inside the tank (2) of the water heater (3, 30) and passes, by way of a gland (11), through the thickness of the bottom (13) of said tank (2) so as to allow it to be coupled to the indicator device (12).

4. The detection device as claimed in claim 1, wherein the indicator device (12) comprises an amplifying device (15) making it possible to transmit a motion to a member (16) moving along a graduated scale (17) indicating the quantity of hot water available remaining in the tank (2).

5. The detection device as claimed in claim 4, wherein the amplifying device (15) consists of a Bourdon tube (18) making it possible to transmit the motion to the member (16) formed of a needle (19) secured to an axle (20) in such a way as to move along the graduated scale (17).

6. The detection device as claimed in claim 5, wherein the axle (20) is connected with the free end (18a) of the Bourdon tube (18) by way of a notch (20a) making it possible, during the deformation of said tube under the effect of the expansion of the fluid contained in the capillary tube (10), to rotate the needle (19).

7. The detection device as claimed in claim 1, wherein the indicator device (12) comprises an amplifying device (15) which consists of a membrane (22) coupled hermetically to the capillary tube (10) and of an electronic sensor (23) linked by a connection (23a) to an electronic system (24, 26).

8. The detection device as claimed in claim 7, wherein the electronic sensor (23) is overlaid on the surface of the membrane (22) whose deformation is proportional to the expansion of the heat-carrying fluid contained inside the capillary tube (10) in such a way as to transcribe into a variation in resistance that can be utilized by an electronic measurement card (24).

9. The detection device as claimed in claim 8, wherein the electronic measurement card (24) is provided inside a housing (24a) allowing display in digital form (24b) or in visual form comprising a luminous bar graph (25) of the quantity of hot water available remaining in the tank (2).

10. The detection device as claimed in claim 7, wherein the amplifying device (15) is linked by a connection (23a) to an electronic system (26) allowing the control of at least one boost resistor (27) of an electro- or hydro-solar water heater (30).

11. The detection device as claimed in claim 7, wherein the amplifying device (15) is linked by a connection (23a) to an electronic system (26) allowing the control of the circulation of a heat-carrying fluid issuing from a boiler into a serpentine (29) located inside a hydro-solar water heater (30).

12. The detection device as claimed in claim 7, wherein the amplifying device (15) is linked by a connection (23a) to an electronic system (26) allowing the control of the circulation of a heat-carrying fluid issuing from solar sensors into a serpentine (28) located inside an electro- or hydro-solar water heater (30).

* * * * *